(12) United States Patent
Itou

(10) Patent No.: US 11,586,170 B2
(45) Date of Patent: Feb. 21, 2023

(54) NUMERICAL CONTROLLER AND NUMERICAL CONTROL SYSTEM

(71) Applicant: FANUC CORPORATION, Yamanashi (JP)

(72) Inventor: Tomoya Itou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/826,959

(22) Filed: Mar. 23, 2020

(65) Prior Publication Data

US 2020/0319619 A1 Oct. 8, 2020

(30) Foreign Application Priority Data

Apr. 4, 2019 (JP) .............................. JP2019-072036

(51) Int. Cl.
  G05B 19/4065 (2006.01)
(52) U.S. Cl.
  CPC .......... G05B 19/4065 (2013.01); *G05B 2219/32226* (2013.01)
(58) Field of Classification Search
  CPC ...... G05B 19/4065; G05B 2219/32226; G05B 2219/49135; G05B 19/4155; G05B 19/4063; G05B 19/19; G05B 2219/35349
  USPC ........................................................ 700/179
  See application file for complete search history.

(56) References Cited

U.S. PATENT DOCUMENTS

| | | | | |
|---|---|---|---|---|
| 2001/0049974 | A1* | 12/2001 | Akamatsu | B23Q 17/22 73/865.9 |
| 2010/0154605 | A1* | 6/2010 | Kase | B23Q 17/2233 82/1.11 |
| 2015/0134105 | A1* | 5/2015 | Iuchi | G05B 19/19 700/186 |

(Continued)

FOREIGN PATENT DOCUMENTS

| | | |
|---|---|---|
| JP | 4-82645 | 3/1992 |
| JP | 6-206143 | 7/1994 |

(Continued)

OTHER PUBLICATIONS

Office Action dated Sep. 7, 2021 in Japanese Patent Application No. 2019-072036.

(Continued)

*Primary Examiner* — Kenneth M Lo
*Assistant Examiner* — Mohammed Shafayet
(74) *Attorney, Agent, or Firm* — Wenderoth, Lind & Ponack, L.L.P.

(57) ABSTRACT

A numerical controller, which is configured to control maintenance of a machine tool, includes a mode shift part configured to shift an operation mode of the machine tool to a maintenance mode, on the basis of input of a trigger for starting the maintenance of the machine tool, an operation execution part configured to make the machine tool operate on the basis of predetermined maintenance contents; and an output control part configured to control output of an operation result of the machine tool, as a maintenance result. The mode shift part returns the operation mode of the machine tool to a normal operation mode, after the output of the maintenance result by the output control part.

13 Claims, 6 Drawing Sheets

(56) References Cited

U.S. PATENT DOCUMENTS

| | | | | |
|---|---|---|---|---|
| 2016/0346890 A1* | 12/2016 | Dunkin | ............. | G05B 19/4065 |
| | | | | 700/175 |
| 2018/0275630 A1* | 9/2018 | Kao | ................... | H04L 41/5041 |
| 2019/0346822 A1* | 11/2019 | Jalluri | ................... | G01M 13/00 |
| 2019/0377324 A1* | 12/2019 | Nagatomo | ........... | G05B 19/409 |
| 2020/0004221 A1* | 1/2020 | Sarup | ................ | G05B 19/4065 |
| 2020/0061768 A1* | 2/2020 | Morita | ................... | B23Q 17/09 |

FOREIGN PATENT DOCUMENTS

| | | |
|---|---|---|
| JP | 2001-347440 | 12/2001 |
| JP | 2004-525467 | 8/2004 |
| JP | 5887299 | 3/2016 |
| JP | 2017-177298 | 10/2017 |
| JP | 2018-73327 | 5/2018 |
| JP | 2019-18338 | 2/2019 |

OTHER PUBLICATIONS

Notification of Reasons for Refusal issued in the JP Patent Application No. 2019-072036, dated Mar. 15, 2022.

\* cited by examiner

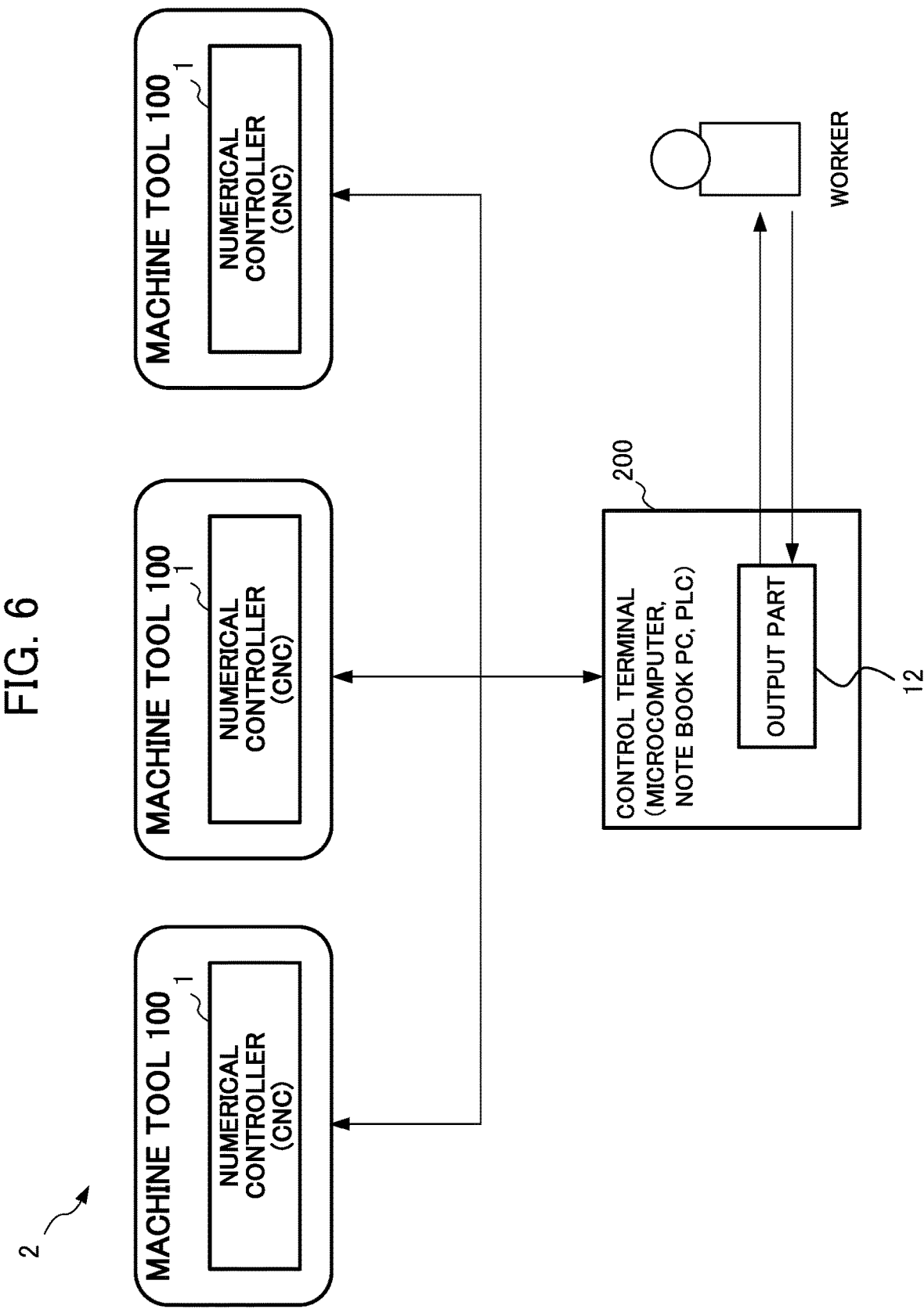

NUMERICAL CONTROLLER AND NUMERICAL CONTROL SYSTEM

This application is based on and claims the benefit of priority from Japanese Patent Application No. 2019-072036, filed on 4 Apr. 2019, the content of which is incorporated herein by reference.

BACKGROUND OF THE INVENTION

Field of the Invention

The present invention relates to a numerical controller and a numerical control system.

Related Art

Conventionally, a machine tool in which a (computerized) numerical controller (CNC) for machining is incorporated has been known. The machine tool is controlled in operation by the numerical controller.

A machine tool stably operating for a long period should be subjected to various types of maintenance including periodic inspection, care of respective mechanical components, and care of electrical components. Such maintenance includes works relatively easy to be performed, such as cleaning of the machine, visual inspection, and grease coating to the mechanical components not requiring operation of the machine. Such maintenance further includes non-steady works, such as a checking work with mechanical operation (for example, checking whether or not any noise is generated in each axis, measurement of vibration of a spindle), a work requiring change in a torque control method (with change in parameters), and replacement and adjustment of components in the coordinate area in which movement is prohibited in a normal mode. As one example of such non-steady works, means of measuring a clamping torque of a rotary table, involved in change in parameters has been proposed (refer to, for example, Patent Document 1).

Patent Document 1: Japanese Patent No. 5887299

SUMMARY OF THE INVENTION

In Patent Document 1, as described above, a maintenance work is performed as a non-steady work. Therefore, such a maintenance work is carried out, for example, after the change of the operation mode of a machine tool. For example, in the case where a non-steady work is carried out, a numerical controller shifts the operation mode of the machine tool from a normal mode to a maintenance mode, and further changes parameters. In Patent Document 1, the machine tool is shifted into a mode different from the normal operation mode, and is further shifted, as change in parameters, into the torque control method of gradually increasing the torque to rotate the shaft of the rotary table.

It is noted that after such a maintenance work is completed, the changed parameters of the machine tool are returned to original values. Then, the operation mode is shifted from the maintenance mode to the normal mode. The processing allows the machine tool to perform the same operation as the operation before the maintenance. On the other hand, the failure of returning the changed parameters to original values should be suppressed.

(1) The present disclosure in one aspect relates to a numerical controller configured to control maintenance of a machine tool. The numerical controller includes a mode shift part configured to shift an operation mode of the machine tool to a maintenance mode, on the basis of input of a trigger for starting the maintenance of the machine tool, an operation execution part configured to make the machine tool execute a maintenance operation on the basis of predetermined maintenance contents, and an output control part configured to control output of a result of the maintenance operation of the machine tool, as a maintenance result. The mode shift part returns the operation mode of the machine tool from the maintenance mode to a normal operation mode, after the output of the maintenance result by the output control part.

(2) The present disclosure in one aspect relates to a numerical control system including the numerical controller according to (1), the machine tool configured to be controlled by the numerical controller, and a control terminal connected to the numerical controller and the machine tool and configured to control the maintenance operations of the numerical controller and the machine tool.

(3) The present disclosure in one aspect relates to a numerical control system including includes a plurality of the numerical controllers and a plurality of the machine tools according to (1), and a control terminal connected to the plurality of numerical controllers and the plurality of machine tools and configured to control the maintenance operations respectively of the numerical controllers and the machine tools.

The present disclosure in one aspect enables to provide a numerical controller and a numerical control system capable of suppressing failure of returning changed parameters to original values.

BRIEF DESCRIPTION OF THE DRAWINGS

FIG. 6 is a schematic diagram illustrating configuration of a numerical control system according to a third embodiment.

DETAILED DESCRIPTION OF THE INVENTION

Figure 1:
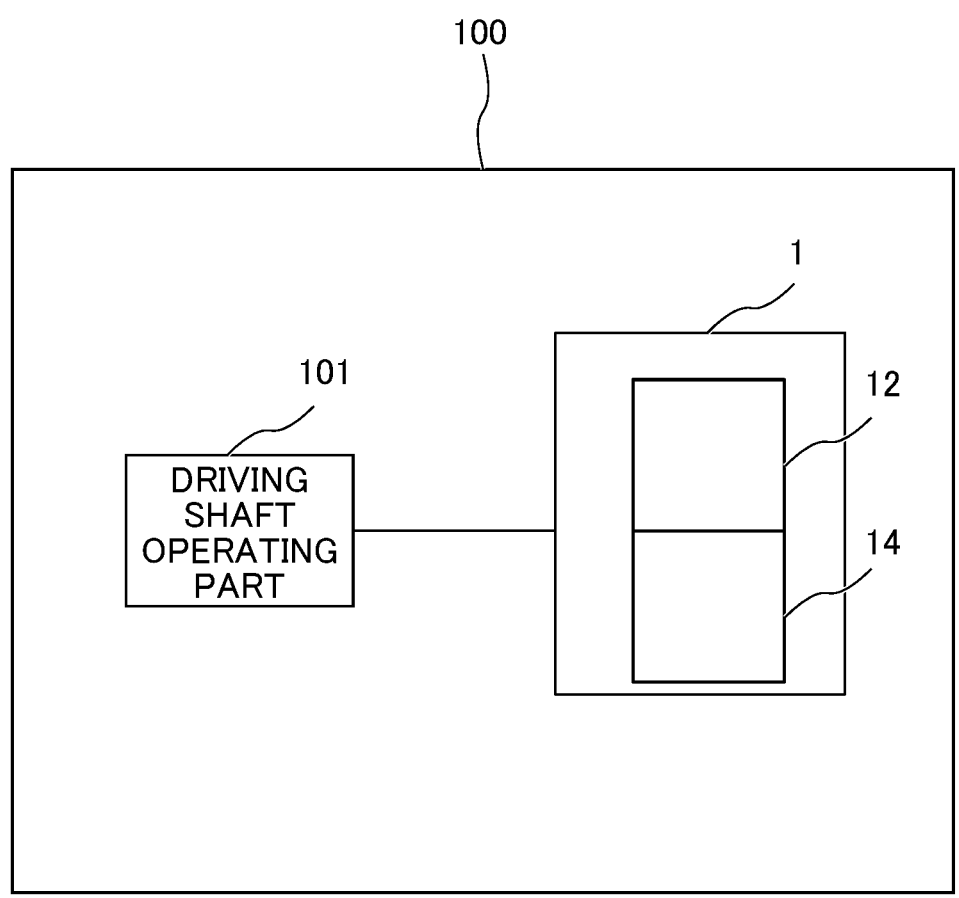
FIG. 1 is a schematic diagram illustrating a numerical controller according to a first embodiment, and a machine tool.

A numerical controller 1 and a numerical control system 2 according to each of the embodiments of the present disclosure will be described below with reference to FIG. 1 to FIG. 6. The numerical controller 1 according to each of the embodiments is combined with a machine tool 100. The numerical controller 1 controls the operation of the combined machine tool 100. In an example, the numerical controller 1 controls the operation of the machine tool 100 having a driving shaft (main shaft, direct moving shaft, additional shaft, etc.) not shown. The numerical controller 1 stores, for example, the operation range of the driving shaft of the machine tool 100 in a normal operation state, as restriction contents of the operation (hereinafter, also referred to as parameters). In other words, the numerical controller 1 restricts the operation range or the like of the machine tool 100 on the basis of the restriction contents of the operation. The machine tool 100 has a driving shaft operating part 101 configured to make the driving shaft operate actually. The numerical controller 1 issues an instruction for actual operation to the driving shaft operating part 101, and further acquires the operation result from the driving shaft operating part 101.

In each of the embodiments, in the case where the machine tool 100 is to be maintained, the restriction contents of the maintenance operation are set in the numerical controller 1. In other words, the setting in the numerical controller 1 is changed from the restriction contents of the operation in an operation mode for a normal operation state (normal operation mode) to the restriction contents of the operation in an operation mode for a maintenance state (maintenance mode). As one example, in the numerical controller 1, the control of instantaneously generating a torque of the driving shaft of the machine tool 100 is set as the restriction contents of the operation in the normal operation mode. In another example, in the numerical controller 1, the control of gradually increasing the torque of the driving shaft of the machine tool 100 is set as the restriction contents of the operation in the maintenance mode. In the numerical controller 1 and the numerical control system 2 according to each of the embodiments, the changed restriction contents of the operation are able to be automatically returned to the restriction contents of the operation in the normal operation mode after the completion of the maintenance. In other words, in the numerical controller 1 and the numerical control system 2, the restriction contents of the operation to be set in the machine tool 100 are able to be automatically returned, after the completion of the maintenance, from the restriction contents of the operation in the maintenance mode to the restriction contents of the operation in the normal operation mode. It is noted that the maintenance is a generic term for the works of maintaining and managing the machine tool 100, such as periodic inspection, care, and adjustment.

First Embodiment

Figure 2:
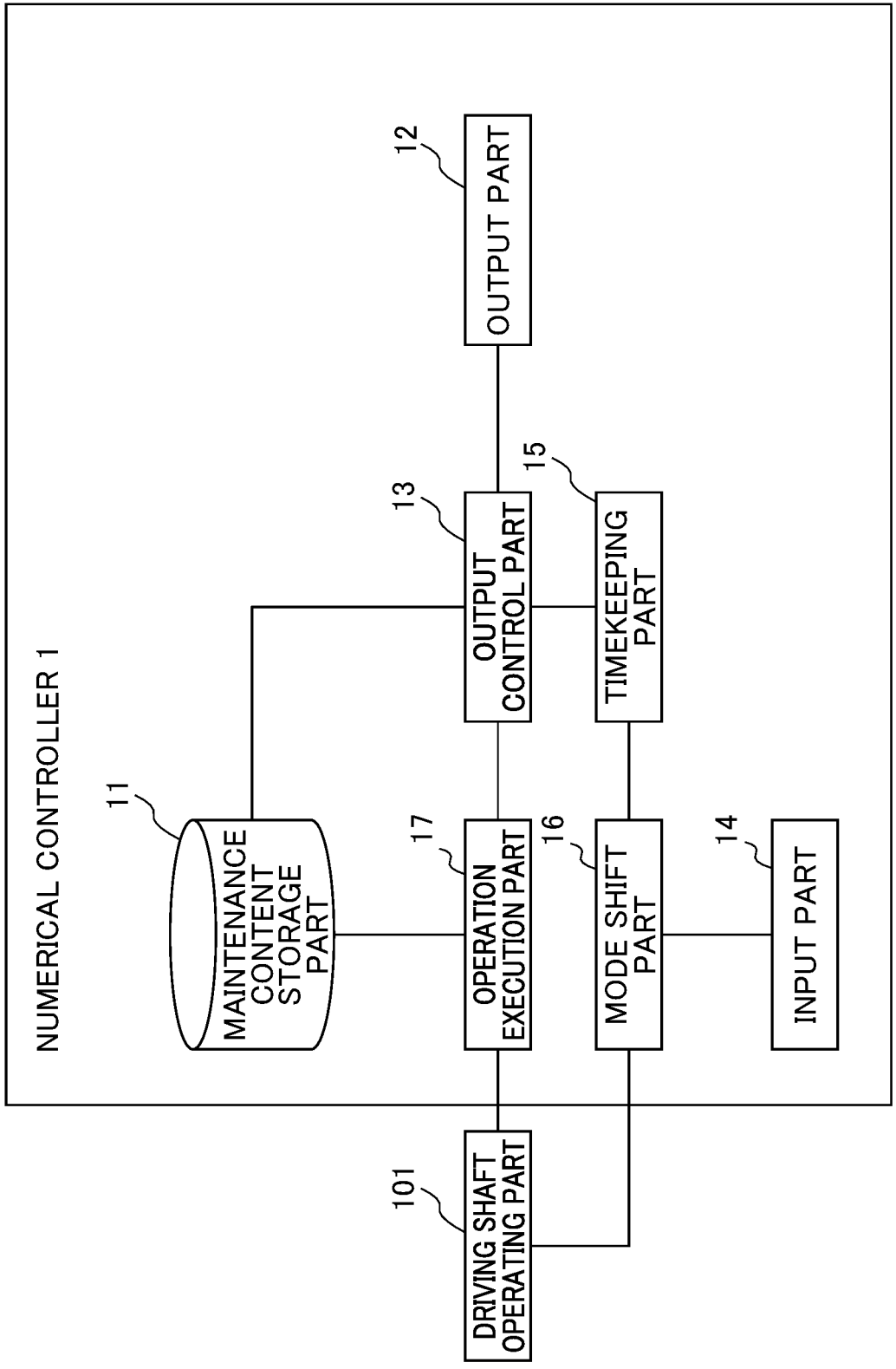
FIG. 2 is a block diagram illustrating the numerical controller of the first embodiment.

The numerical controller 1 according to the first embodiment of the present disclosure is described next with reference to FIG. 1 to FIG. 4. As shown in FIG. 1, the numerical controller 1 according to the present embodiment is incorporated in the machine tool 100. The numerical controller 1 is configured so as to accept input from a worker (not shown), and further so as to display the status of the machine tool 100. As shown in FIG. 2, the numerical controller 1 includes a maintenance content storage part 11, an output part 12, an output control part 13, an input part 14, a timekeeping part 15, a mode shift part 16, and an operation execution part 17.

The maintenance content storage part 11 is, for example, a secondary storage medium such as a hard disk. The maintenance content storage part 11 stores, together with a maintenance type of the machine tool 100, maintenance contents for guidance of a procedure for each type. The maintenance content storage part 11 further stores, as maintenance contents for each type, restriction contents of the operation of the machine tool 100, and operation instruction information for actually making the machine tool 100 operate. The maintenance content storage part 11 stores, as the operation instruction information, for example, the contents for making the machine tool 100 operate in response to the operation instruction related to at least one shaft.

The output part 12 is, for example, a display device such as a monitor. The output part 12 displays a maintenance type of the machine tool 100, and a procedure for each type. The output part 12 displays a maintenance result of the machine tool 100.

The output control part 13 is realized when a CPU operates, as an example. The output control part 13 controls the contents to be displayed on the output part 12. The output control part 13 controls, for example, the output of the result of the maintenance operation of the machine tool 100 in the maintenance, as the maintenance result. Specifically, the output control part 13 controls the output of the maintenance result to be displayed on the output part 12. The output control part 13 further controls, for example, the output of a maintenance type and the output of a procedure of maintenance contents for each type. Specifically, the output control part 13 reads out, from the maintenance content storage part 11, a maintenance type and the procedure of the maintenance contents thereof. The output control part 13 makes the output part 12 display the read-out maintenance type and the procedure of the read-out maintenance contents.

The input part 14 is an input device, for example, a keyboard or a mouse. The input part 14 accepts input from a worker (not shown). The input part 14 accepts, for example, the input of a trigger for starting maintenance. The input part 14 also accepts, for example, the input for controlling the operation of the driving shaft of the machine tool 100.

The timekeeping part 15 is realized when a CPU operates, as an example. The timekeeping part 15 is a so-called timer. The timekeeping part 15 outputs time information relating to time to the output control part 13.

The mode shift part 16 is realized when a CPU operates, as an example. The mode shift part 16 shifts the operation mode of the machine tool 100 to the maintenance mode, on the basis of the input of the trigger for starting the maintenance of the machine tool 100. The mode shift part 16 returns the operation mode of the machine tool 100 from the maintenance mode to the normal operation mode, after the output control part 13 outputs the maintenance result. The mode shift part 16 acquires in advance, for example, the restriction contents of the operation of the machine tool 100 in the maintenance mode (the restriction contents of the maintenance operation), and further sets the acquired restriction contents of the operation to the machine tool 100, on the basis of the input of the trigger. Specifically, the mode shift part 16 shifts the operation mode of the machine tool 100 to the maintenance mode, on the basis of the restriction contents of the operation included in the maintenance contents read out from the maintenance content storage part 11.

The operation execution part 17 is realized when a CPU operates, as an example. The operation execution part 17 makes the machine tool 100 execute the maintenance operation on the basis of predetermined maintenance contents. Specifically, the operation execution part 17 makes the machine tool 100 operate on the basis of predetermined maintenance contents, after the mode shift part 16 changes the restriction contents of the operation of the machine tool 100. The operation execution part 17 makes the machine tool 100 operate on the basis of, for example, the operation instruction information stored in the maintenance content storage part 11. The operation execution part 17 further acquires the operation result from the machine tool 100 as the maintenance result. The operation execution part 17 transmits the acquired maintenance result to the output control part 13.

Figure 3:
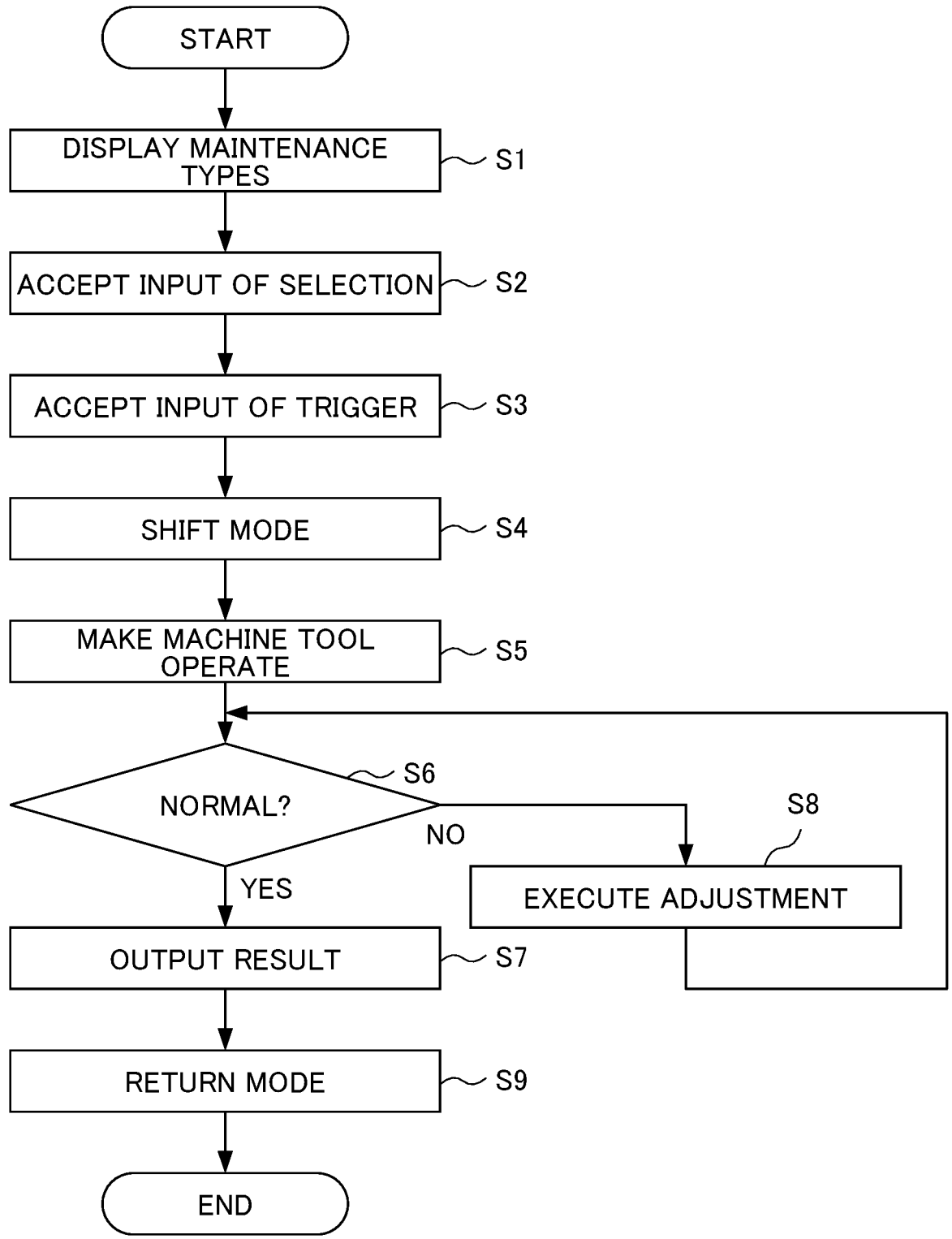
FIG. 3 is a flowchart indicating the operation of the numerical controller of the first embodiment.

The operation of the numerical controller 1 is described next with reference to FIG. 3. The input part 14 first accepts an instruction for reading out maintenance types. The output control part 13 reads out, on the basis of the instruction for reading out maintenance types, maintenance types from the maintenance content storage part 11. The output control part 13 makes the output part 12 display the read-out maintenance types (step S1).

Figure 4:
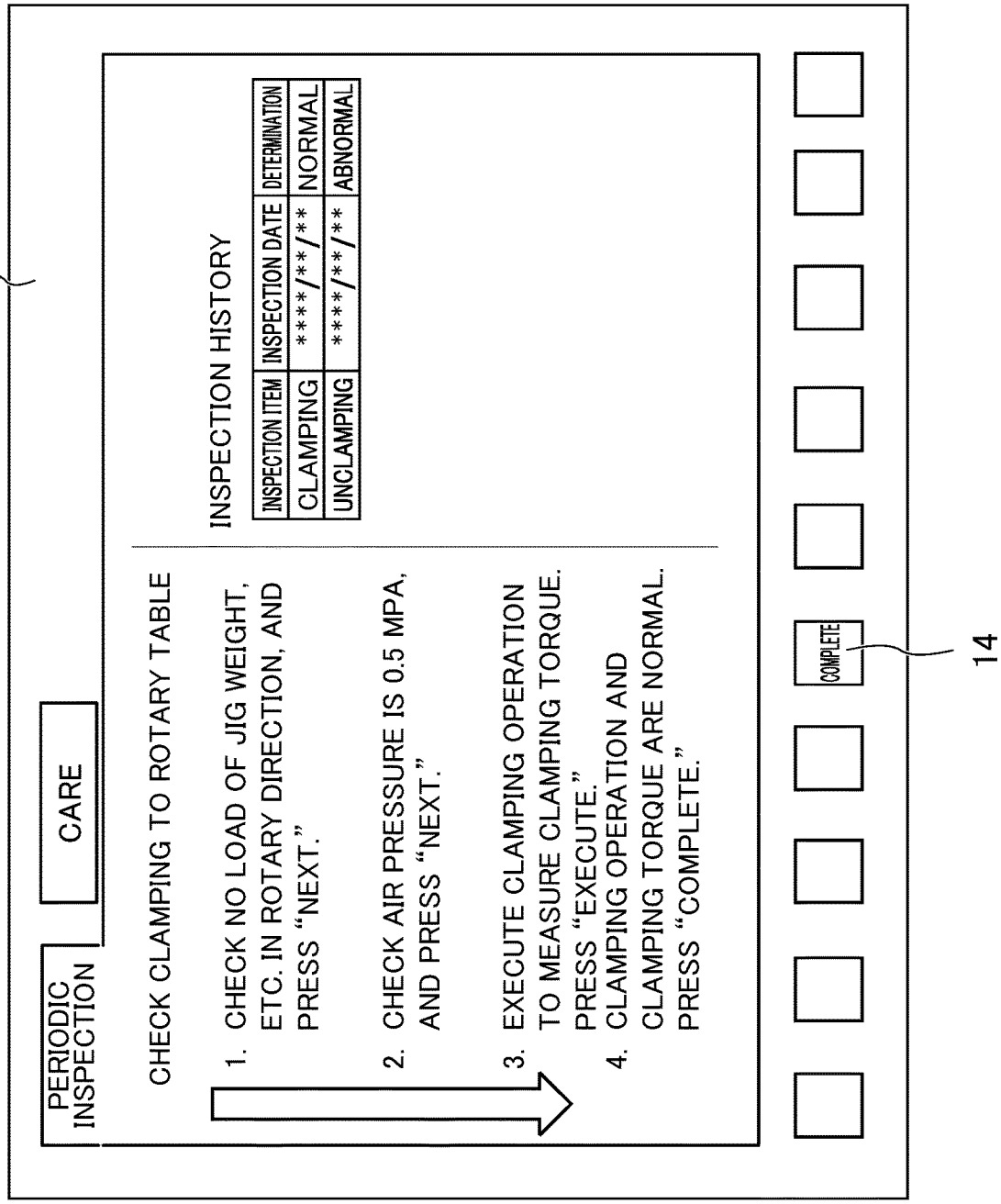
FIG. 4 is a screen shot indicating maintenance contents to be displayed on the numerical controller of the first embodiment.

The input part 14 then accepts, from a worker, the input of selecting the maintenance type to be carried out (step S2). The output control part 13 acquires the information (maintenance contents) for the guidance of the procedure of the selected maintenance type, from the maintenance content storage part 11. The output control part 13 makes the output part 12 display the maintenance contents. The mode shift part 16 acquires the restriction contents of the maintenance operation of the machine tool 100 for the selected maintenance type, from the maintenance content storage part 11. The operation execution part 17 then acquires the operation instruction information to the machine tool 100 for the selected maintenance type, from the maintenance content storage part 11. At this time, the output control part 13 makes the output part 12 display the guidance indicating the procedure of the maintenance contents as shown in FIG. 4.

The input part 14 then accepts the input of the trigger for starting the maintenance of the machine tool 100 (step S3). In an example, the input part 14 accepts the input of the trigger for shifting the operation mode of the machine tool 100 to the maintenance mode. The input part 14 transmits the accepted input of the trigger to the mode shift part 16.

The mode shift part 16 shifts the operation mode of the machine tool 100 to the maintenance mode, on the basis of the input trigger (step S4). In an example, the mode shift part 16 sets the operation restriction to the actual operation of the machine tool 100, on the basis of the acquired restriction contents of the maintenance operation. As one example, the mode shift part 16 sets, as the restriction contents of the maintenance operation, the control of instantaneously generating or gradually increasing the torque of a motor (not shown). As another example, the mode shift part 16 sets, as the restriction contents of the maintenance operation, the restriction of motor speed or the release of the restriction. In the present embodiment, the mode shift part 16 sets the operation restriction of performing a clamping operation to a rotary table (the control of gradually increasing the torque during clamping) to the machine tool 100. (refer to, for example, No. 1. to No. 3. shown in FIG. 4).

The operation execution part 17 then makes the machine tool 100 operate on the basis of the read-out maintenance contents (operation instruction information) (step S5). The operation execution part 17 acquires, after the operation, the operation result of the machine tool 100 as the maintenance result from the driving shaft operating part 101. In the present embodiment, the operation execution part 17 makes the machine tool 100 perform the clamping operation and the operation of moving the shaft by a minute angle as the operation instruction information. The operation execution part 17 then acquires the torque during the operation of moving the shaft, to determine the quality of the clamping operation (refer to, for example, No. 4. shown in FIG. 4).

In the case where the maintenance result falls within the range of normal values in comparison with the maintenance contents (yes in step S6), the output control part 13 makes the output part 12 display the maintenance result (step S7), and the processing is transferred to step S9. In the case where the maintenance result is outside the range of normal values in comparison with the maintenance contents, the processing is transferred to step S8.

In step S8, the operation of adjusting the state of the machine tool 100 is executed. Examples of the operation include replacement of a component of the machine tool 100 and change in the operation restriction contents to be executed by the operation execution part 17 in the normal operation mode. After the adjustment in the machine tool 100, the processing is returned to step S6.

In step S9, the mode shift part 16 returns the operation of the machine tool 100 from the maintenance mode to the normal operation mode, after the timekeeping part 15 measures a predetermined period of time after the output of the maintenance result (step S8). In the present embodiment, the mode shift part 16 returns the machine tool 100 to the normal operation mode by, for example, changing the control method to the method of instantaneously generating the torque for the clamping.

The numerical controller 1 according to the present embodiment described above exhibits the following effects.

(1) The numerical controller 1, which is configured to control the maintenance of the machine tool 100, includes the mode shift part 16 configured to shift the operation mode of the machine tool 100 to the maintenance mode, on the basis of input of the trigger for starting the maintenance of the machine tool 100, the operation execution part 17 configured to make the machine tool 100 execute the maintenance operation on the basis of predetermined maintenance contents, and the output control part 13 configured to control the output of the result of the maintenance operation of the machine tool 100, as the maintenance result. The mode shift part 16 returns the operation mode of the machine tool 100 from the maintenance mode to the normal operation mode, after the output of the maintenance result by the output control part 13. This enables to suppress the machine tool 100 kept in the maintenance mode from performing normal operation after the completion of the maintenance. In other words, this enables to suppress the machine tool 100 with the set values for the maintenance from executing machining. Accordingly, a failure in machining is able to be suppressed from occurring.

(2) The mode shift part 16 acquires, in advance, the restriction contents of the maintenance operation of the machine tool 100 in the maintenance mode, and sets the acquired restriction contents of the operation in the machine tool 100, on the basis of the input of the trigger. This enables to automatically set the restriction contents of the operation for the maintenance mode in the machine tool 100, in response to the input of the trigger. Accordingly, even a person not skilled in the art is able to start the maintenance appropriately.

(3) The output control part 13 outputs display of the contents of the trigger operation and the guidance of the procedure of the maintenance contents to a worker. This allows a worker to easily grasp the details of the maintenance contents.

(4) The maintenance contents include the operation instruction information for making the machine tool 100 operate actually. The operation execution part 17 makes the machine tool 100 execute the maintenance operation on the basis of the operation instruction information. This allows a worker, regardless of the skill level of the worker, to easily execute the maintenance work.

(5) The mode shift part 16 returns the operation mode of the machine tool 100 to the normal operation mode, after a predetermined period of time elapses after the output of the maintenance result. This enables to suppress the machine tool 100 kept in the maintenance mode from executing machining.

Second Embodiment

Figure 5:
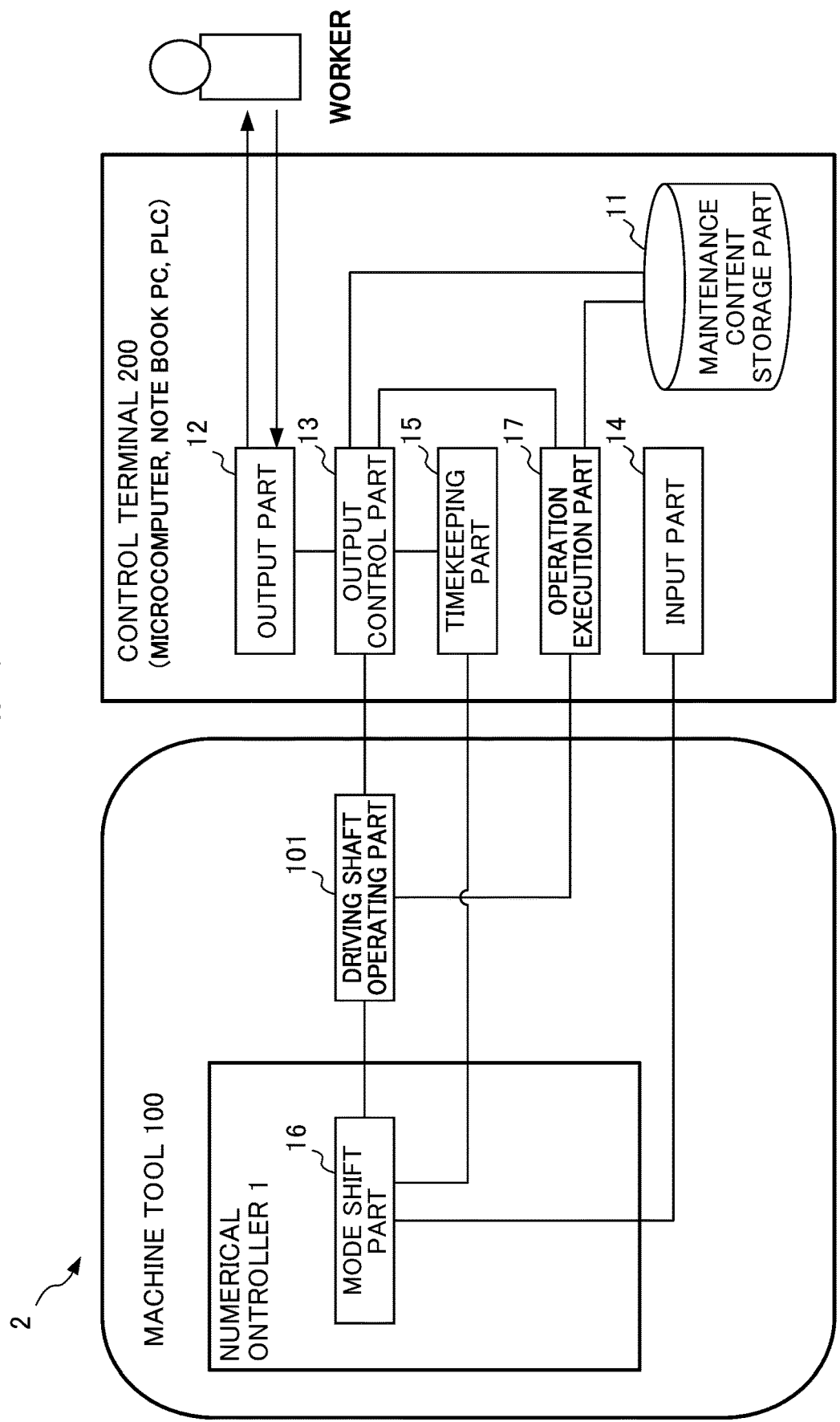
FIG. 5 is a schematic diagram illustrating configuration of a numerical control system according to a second embodiment.

The numerical control system 2 according to the second embodiment of the present disclosure is described next with reference to FIG. 5. In the description of the second embodiment, the same components as those in the embodiment described above are denoted by the same reference numerals, and the descriptions thereof are omitted or simplified. The second embodiment is different from the first embodiment, in that as shown in FIG. 5, the numerical control system 2 according to the second embodiment includes a control terminal 200 provided separately from the numerical controller 1 and the machine tool 100. Moreover, the second embodiment is different from the first embodiment, the numerical control system 2 according to the second embodiment is in that the functions of the maintenance content storage part 11, the output part 12, the output control part 13, the input part 14, the timekeeping part 15, and the operation execution part 17 of the numerical controller 1 in the first embodiment are realized in the control terminal 200 of the numerical control system 2.

The numerical control system 2 according to the present embodiment described above exhibits the following effect.

(6) The numerical control system 2 according to the present embodiment described above includes the numerical controller 1 of the first embodiment, the machine tool 100 configured to be controlled by the numerical controller 1, the control terminal 200 connected to the numerical controller 1 and the machine tool 100 and configured to control the maintenance operations of the numerical controller 1 and the machine tool 100. This enables to remotely execute the maintenance of the numerical controller 1 and the machine tool 100. Accordingly, the maintenance is able to be executed more easily.

Third Embodiment

The numerical control system 2 according to the third embodiment of the present disclosure is described next with reference to FIG. 6. In the description of the third embodiment, the same components as those in the embodiments described above are denoted by the same reference numerals, and the descriptions thereof are omitted or simplified. The third embodiment is different from the second embodiment, the numerical control system 2 according to the third embodiment is in that as shown in Fi. 6, the control terminal 200 of the second embodiment is connected to a plurality of the numerical controllers 1 and a plurality of the machine tools 100 in the numerical control system 2.

(7) The numerical control system 2 includes the plurality of numerical controllers 1 and the plurality of machine tools 100 according to the first embodiment, and the control terminal 200 connected to the plurality of numerical controllers 1 and the plurality of machine tools 100 and configured to control the maintenance operations respectively of the numerical controllers 1 and the machine tools 100. This enables to remotely execute the maintenance of the plurality of numerical controllers 1 and the plurality of machine tools 100. Accordingly, the maintenance is able to be executed further more easily.

The descriptions so far are about the embodiments of the numerical controller and the numerical control system of the present disclosure. The present disclosure is not limited to the above-described embodiments, but includes appropriate modifications. In an example, in the above-described embodiments, the input part 14 may accept the input of selection of a plurality of maintenance types. The mode shift part 16 and the operation execution part 17 may execute the plurality of maintenance types of maintenance selected in advance by a worker, in order. This eliminates the needs for acceptance of the input of the type of maintenance from a worker every time one type of maintenance is completed. Accordingly, the convenience in the input of the maintenance is able to be improved.

In the descriptions of the embodiments above, the mode shift part 16 returns the operation mode of the machine tool 100 to the normal mode, by returning the operation restriction contents of the machine tool 100. The present disclosure is not limited thereto. In an example, the operation execution part 17 may make the driving shaft move to the position for the normal mode.

In the embodiments described above, the operation restriction contents which the mode shift part 16 has no change authority in the normal mode may be changed to the read-out operation restriction contents in the maintenance mode. This allows a user also to execute the maintenance, thereby enabling to increase the opportunity of the maintenance of the machine tool 100. In an example, the machine tool 100 is able to be maintained in the state where the door of the machine tool 100 remains open.

In the above embodiments, the mode shift part 16 may set the operation restriction contents for allowing the driving shaft to move into the coordinate area in which the movement is prohibited in the normal operation mode. This enables to perform the maintenance in the state where the driving shaft is moved to the outside of a machining area. Accordingly, workability during maintenance is improved.

In the above embodiments, the mode shift part 16 may set the operation restriction contents for restricting the operation of an external device other than the machine tool 100. The mode shift part 16 may cut air supply to the machine tool 100 of the air used in the machine tool 100 for, for example, intrusion prevention of coolant by air purge, removal of chips by air blow, or the air for clamping operation in the rotary table. This enables to improve the safety in the maintenance work.

In the descriptions of the embodiments above, the output control part 13 and the output part 12 are respectively a display control part and a display part. The present disclosure is not limited thereto. The output control part 13 and the output part 12 may be devices configured to perform output by printing, sound, and other methods.

In the descriptions of the embodiments above, the mode shift part 16 returns the operation mode of the machine tool to the normal operation mode after a predetermined period of time has elapsed. The present disclosure is not limited thereto. In an example, the mode shift part 16 may return the operation mode of the machine tool to the normal operation mode on the basis of the input for mode returning on the input part 14.

In the above embodiments, the output control part 13 may output, when a maintenance timing arrives, the notification indicating the arrival to the output part 12. The maintenance content storage part 11 may further store past maintenance dates and times and information on maintenance intervals, for each maintenance type. The output control part 13 may calculate the following maintenance date and time by use of the past maintenance dates and times and the information on maintenance intervals. The output control part 13 may compare the calculated following maintenance date and time and the date and time measured by the timekeeping part 15, to determine the necessity of the notification to the output part 12.

EXPLANATION OF REFERENCE NUMERALS

1 NUMERICAL CONTROLLER
2 NUMERICAL CONTROL SYSTEM
13 OUTPUT CONTROL PART
16 MODE SHIFT PART
17 OPERATION EXECUTION PART
100 MACHINE TOOL
200 CONTROL TERMINAL

What is claimed is:

1. A numerical controller configured to control maintenance of a machine tool, the numerical controller comprising:
a mode shift part configured to shift an operation mode of the machine tool to a maintenance mode from a normal operation mode, on a basis of input of a trigger for starting the maintenance of the machine tool;
an operation execution part configured to make the machine tool execute a maintenance operation on a basis of predetermined maintenance contents; and
an output control part configured to control output of a result of the maintenance operation of the machine tool, as a maintenance result,
wherein the mode shift part acquires, in advance, restriction contents of the maintenance operation in the maintenance mode, and sets the acquired restriction contents of the operation of the machine tool, on the basis of the input trigger and wherein when the maintenance result obtained by the operation execution part is determined to be within a range of normal values in comparison with the predetermined maintenance contents, the output control part controls the output of the maintenance result, and when the maintenance result is determined to be outside the range of normal values, the operation execution part determines whether the maintenance result is within the range of normal values after executing an operation to adjust a state of the machine tool,
the mode shift part automatically returns the operation mode of the machine tool from the maintenance mode to the normal operation mode, when a predetermined time period elapses after the output of the maintenance result, and
wherein the output control part is configured to calculate a maintenance date and time by use of past maintenance dates and times and information on maintenance intervals, for each maintenance type of a plurality of maintenance types, and control output of a notification when the output of the notification of the calculated maintenance date and time is necessary.

2. The numerical controller according to claim 1, wherein the output control part outputs display of guidance of a procedure of the predetermined maintenance contents to a worker.

3. The numerical controller according to claim 1, wherein the predetermined maintenance contents include operation instruction information for making the machine tool perform an actual operation, and
the operation execution part makes the machine tool execute the maintenance operation on a basis of the operation instruction information.

4. The numerical controller according to claim 1, wherein the mode shift part and the operation execution part execute the plurality of maintenance types of the maintenance selected in advance by a worker, in order.

5. A numerical control system comprising:
the numerical controller according to claim 1;
the machine tool configured to be controlled by the numerical controller; and
a control terminal connected to the numerical controller and the machine tool, the control terminal configured to control maintenance operations of the numerical controller and the machine tool.

6. A numerical control system comprising:
a plurality of the numerical controllers and a plurality of the machine tools according to claim 1; and
a control terminal connected to the plurality of numerical controllers and the plurality of machine tools, the control terminal configured to control maintenance operations respectively of the numerical controllers and the machine tools.

7. A numerical controller configured to control maintenance of a machine tool, the numerical controller comprising:
a mode shift part configured to shift an operation mode of the machine tool to a maintenance mode from a normal operation mode having first operation restriction contents, on a basis of input of a trigger for starting the maintenance of the machine tool, wherein the maintenance mode has second operation restriction contents different from the first operation restriction contents in the normal operation mode;
an operation execution part configured to make the machine tool execute a maintenance operation on a basis of predetermined maintenance contents; and
an output control part configured to control output of a result of the maintenance operation of the machine tool, as a maintenance result,
wherein the mode shift part sets the second operation restriction contents included in the predetermined maintenance contents to the machine tool, and wherein when the maintenance result obtained by the operation execution part is determined to be within a range of normal values in comparison with the predetermined maintenance contents, the output control part controls the output of the maintenance result, and when the maintenance result is determined to be outside the range of normal values, the operation execution part determines whether the maintenance result is within the range of normal values after executing an operation to adjust a state of the machine tool, including any one of replacement of a component of the machine tool and change in the first operation restriction contents to be executed by the operation execution part in the normal operation mode,
the mode shift part automatically returns the operation mode of the machine tool from the maintenance mode to the normal operation mode, when a predetermined time period elapses after the output of the maintenance result, and
wherein the output control part is configured to calculate a date and time by use of past maintenance dates and times and information on maintenance intervals, for each maintenance type of a plurality of maintenance types, and control output of a notification when the output of the notification of the calculated maintenance date and time is necessary.

8. The numerical controller according to claim 7, wherein the mode shift part acquires, in advance, third operation restriction contents of the maintenance operation in the maintenance mode, and sets the acquired third operation restriction contents of the maintenance operation in the machine tool, on the basis of the input trigger.

9. The numerical controller according to claim 7, wherein the output control part outputs display of guidance of a procedure of the predetermined maintenance contents to a worker.

10. The numerical controller according to claim 7, wherein the predetermined maintenance contents include operation instruction information for making the machine tool perform an actual operation, and
the operation execution part makes the machine tool execute the maintenance operation on a basis of the operation instruction information.

11. The numerical controller according to claim 7, wherein the mode shift part and the operation execution part execute the plurality of maintenance types of the maintenance selected in advance by a worker, in order.

12. A numerical control system comprising:
the numerical controller according to claim 7;
the machine tool configured to be controlled by the numerical controller; and
a control terminal connected to the numerical controller and the machine tool, the control terminal configured to control maintenance operations of the numerical controller and the machine tool.

13. A numerical control system comprising:
a plurality of the numerical controllers and a plurality of the machine tools according to claim 7; and
a control terminal connected to the plurality of numerical controllers and the plurality of machine tools, the control terminal configured to control maintenance operations respectively of the numerical controllers and the machine tools.

* * * * *